United States Patent [19]

Van Haag

[11] Patent Number: 5,628,717
[45] Date of Patent: May 13, 1997

[54] ROLL, HAVING CONTROLLED BENDING, FOR A CALENDER OR SIMILAR DEVICE

[75] Inventor: Rolf Van Haag, Kerken, Germany

[73] Assignee: Voith Sulzer Finishing GmbH, Krefeld, Germany

[21] Appl. No.: 513,426

[22] Filed: Aug. 10, 1995

[30] Foreign Application Priority Data

Aug. 19, 1994 [DE] Germany ............... 44 29 499.9

[51] Int. Cl.$^6$ ............................................. B29C 43/46
[52] U.S. Cl. .................................... 492/7; 492/20
[58] Field of Search .......................... 492/7, 5, 2, 16, 492/20; 384/99, 100

[56] References Cited

U.S. PATENT DOCUMENTS

| | | | |
|---|---|---|---|
| 3,587,152 | 6/1971 | Hold. | |
| 4,805,279 | 2/1989 | Pav | 492/2 |
| 4,856,157 | 8/1989 | Küsters | 492/7 |
| 5,101,544 | 4/1992 | Kubik | 492/7 |
| 5,189,776 | 3/1993 | Küsters | 492/7 |
| 5,206,978 | 5/1993 | Pav | 492/5 |

FOREIGN PATENT DOCUMENTS

| | | |
|---|---|---|
| 3022491 | 1/1983 | Germany. |
| 3820974 | 4/1990 | Germany. |
| 3835152 C1 | 4/1990 | Germany. |

OTHER PUBLICATIONS

Kusters Brochure, "Hydro Walze kusters" (Kusters ydro Roller) (publication FMD-DRUCK 1000 D Jun. 1989).

Primary Examiner—David P. Bryant
Attorney, Agent, or Firm—Darby & Darby

[57] ABSTRACT

A roll whose bend can be controlled has support elements which are designed as ring elements with an annular pocket and an annular pressure surface. The interior space enclosed by the ring element is connected to an outlet line having an adjustable throttle element. By appropriately adjusting the throttle element, any arbitrary intermediate pressure can be maintained in the interior space. Therefore, a wide adjustment rage for the support force is possible, and needs only a feed line for the pressure medium and an outlet line. In this way, relatively large and relatively small path loads can be processed in the roll gap without a major structural change.

13 Claims, 3 Drawing Sheets

ROLL, HAVING CONTROLLED BENDING, FOR A CALENDER OR SIMILAR DEVICE

FIELD OF THE INVENTION

This invention relates generally to a roll, having controlled bending, for a calender or the like, and more particularly to a roll, whose roll sleeve is supported by means of hydrostatic support elements against a non-rotatably mounted carrier, which support elements are disposed within the roll sleeve. The support elements have at least one pocket in a support surface of the support elements which faces the inside surface of the sleeve, and by means of a pressure surface which faces a carrier and a groove which guides the support elements, the groove and pressure surface form a pressure chamber which is connected, by a feed line for pressurized medium that is equipped with a throttle, to the pocket.

BACKGROUND OF THE INVENTION

A roll having controlled bending is known from DE 30 22 491 C2. This type of roll is suitable not only for calenders, but also for smoothing machines; presses; parts of paper, pulp, and pressure machines; or rolling mills for steel, plastic, and the like.

In conventional rolls, the support elements have a closed support surface with two pockets. Each of the pockets is situated opposite a cylindrical pressure chamber, which is connected to the associated pocket through a throttle bore, and which can be supplied, by means of a control device, with a controllable pressure. The two pressure chambers can be supplied with the same pressure or with different pressures. The support force that can be applied by the support element is limited by the dimensions of the support element and by the control range of the pressure.

In U.S. Pat. No. 3,587,152 to Hold, a roll is disclosed having controlled bending, in which ring elements are used as a ring seal, such that the annular pressure surface which faces the carder is acted upon by the pressure of the in-flowing pressure medium. In this way, the front surface of the ring element is pressed against the inside surface of the roll sleeve. The interior space enclosed by the ring element is connected by a throttle to the intake for the pressure medium. The pressure prevailing in the interior space acts on the roll sleeve. Here, too, the force that can be applied to the roll sleeve is limited by the dimensions of the ring element and by the control range of the pressure.

From DE 38 20 974 C2, a roll having controlled bending is known which has piston-shaped sealing elements, in which a frontal pocket, facing the roll sleeve, is connected unthrottled to a pressure chamber which is connected to the pressure feed line. This pocket is surrounded by a border containing border chambers. The latter are at a distance from one another in the circumferential direction and are connected, by a throttle, to a second pressure feed line. Furthermore, it is possible to completely fill the annular space between the roll sleeve and the carder with a pressure medium at a prescribed pressure. If the pressure in the pocket is higher than the pressure in the intermediate space, the result is an "over-pressure element"; if it is smaller, the result is an "under-pressure element".

SUMMARY OF THE INVENTION

Accordingly, it is an object of the present invention to provide an improved roll having controlled bending.

According to the invention, the support elements are designed as ring elements with an annular pocket and an annular pressure surface and the interior space enclosed by the ring element is connected to an outlet line having an adjustable throttle element.

In this design, the ring elements are support elements, each of which exerts a force on the roll sleeve. This force is based upon the magnitude of the annular pressure surface and the prevailing pressure of the pressure medium. The annular pocket effects a frictionless hydrostatic support of the roll sleeve. At the same time, the annular pocket forms a block between the interior space enclosed by the ring element and the annular space remaining between the roll sleeve and the carrier. Consequently, the pressure in the interior space is independent of the pressure in the annular space.

The throttle element in the outlet line has at least two positions, namely closed and fully open, but preferably can also assume arbitrary intermediate positions. If the throttle element is open, the pressure medium which passes from the annular pocket into the interior space shuts off immediately. The support force is applied solely in the region of the support surface of the ring element. On the other hand, if the throttle element is closed, the same pressure builds up in the interior space as in the annular pocket. Consequently, the surface which is effective for pressure is increased considerably without a major structural change, and thus the support force is also increased. By appropriately adjusting the throttle element, any arbitrary intermediate pressure can be maintained in the interior space. Therefore, a wide adjustment range for the support force is possible, and needs only a feed line for the pressure medium and an outlet line.

In an alternate embodiment, the ring space remaining between the roll sleeve and the carder is connected to an outlet line having a second adjustable throttle element. Here, too, the throttle element can assume at least an open and a closed position, but preferably also assumes arbitrary intermediate positions. If the second throttle element is fully open, no increased pressure forms in the intermediate space. On the other hand, if the second throttle element is closed, a pressure builds up in the intermediate space which is equal to the maximum pocket pressure. Here, too, arbitrary intermediate pressures can be set. It is again especially important that, on account of the annular pocket, no liquid is exchanged between the interior space and the annular space. Of special interest here is the combination of a closed, second throttle element, which results in an increased pressure in the interior space and thus in a "pumping up" of the roll sleeve, and an open, first throttle element, which results in a pressure decrease in the interior space of the ring element. Indeed, the roll sleeve is thus loaded radially outward at the side which is situated diagonally opposite the ring element.

Preferably, the support elements have an annular cross section which facilitates the manufacture of the support elements and of the pressure chambers, as well as the sealing of the support elements. However, cross sections are also possible which differ from an annular shape and which are, for example, square or rectangular.

Preferably, the annular pocket is divided by transverse webs and each pocket segment is connected by a throttle to the pressure chamber. This division does not alter the annular shape of the pocket but increases the stability of the support element with respect to the roll sleeve.

Preferably, the annular pocket and the annular pressure surface are situated radially behind one another so as to be substantially congruent. The pressure surface therefore is loaded in a direction toward the pocket surface. As a result, there is no deflection of the force.

The best results are obtained if the pocket surface is slightly larger than the pressure surface.

In the preferred design, it is advantageous for the adjustable throttle element to be a valve. Such valves can easily be adjusted by a control or regulation apparatus and thus can be readily adapted to the particular operating conditions.

In particular, the adjustable valve is a pressure holding valve. It holds the pressure at a desired level in the interior space of the ring element or the roll-sleeve ring-space.

DETAILED DESCRIPTION OF THE INVENTION

Figure 1:
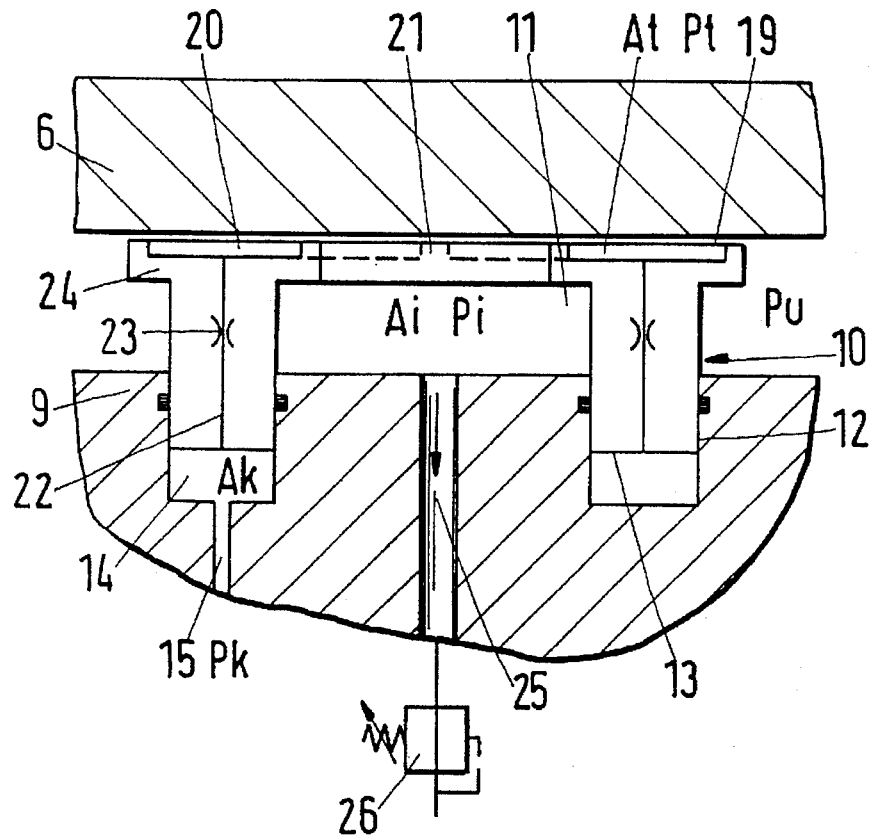
FIG. 1 is an enlarged view of a support dement according to the present invention.
Figure 2:
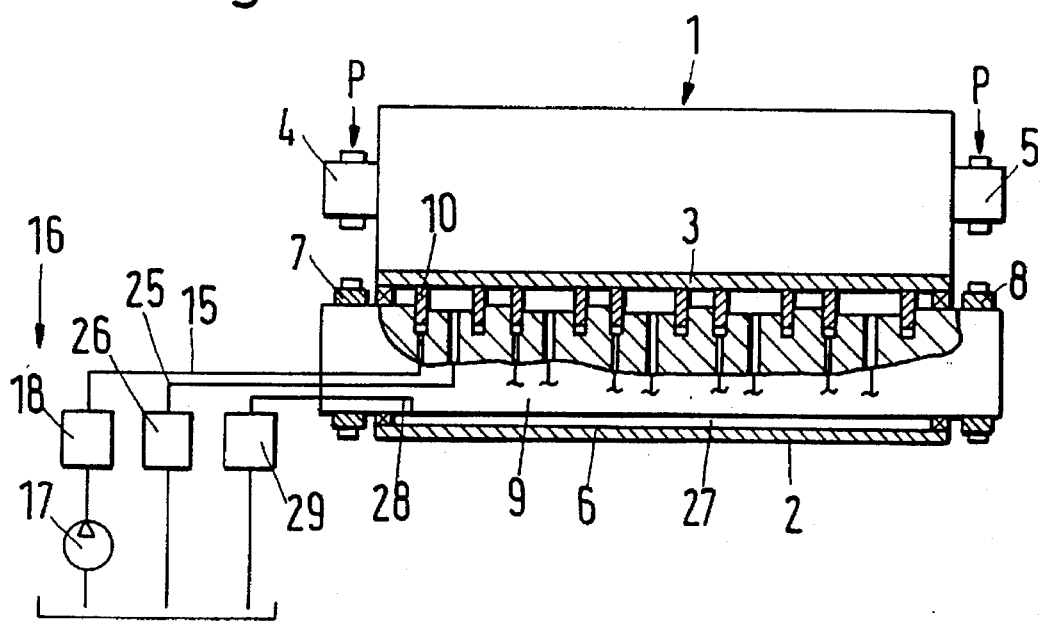
FIG. 2 is a front view of the insertion of the support elements in a calender according to the present invention.

Referring to FIGS. 1 and 2, an upper roll 1 and a lower roll 2 form a press gap 3, in which, for example, a paper web is processed. The ends of the upper roll 1 are held in bearings 4 and 5, which are loaded by an external force P. By raising the bearings 4 and 5, the roll gap 3 can be opened. A rotary drive (not shown) preferably acts on the upper roll 1.

The lower roll 2 has a roll sleeve 6, which can rotate about a carrier 9 that is held non-rotatably in the beatings 7 and 8. Referring particularly to FIG. 1, the lower roll 2 is supported by the support elements 10. The support dement 10 is a ring dement, which encloses an interior space 11. The ring element is guided so as to be sealed in an annular groove 12, which forms a pressure chamber 14 bounded by a pressure surface 13. This pressure chamber 14 is connected by a feed line 15 to a source 16 of pressurized liquid, here represented by a pump 17 and a pressure control valve arrangement 18. The ring element has a support surface 19 which faces the inside surface of the roll sleeve 6. The support surface 19 has an annular pocket 20, which substantially encloses the interior space 11. The support surface 19 is divided into pocket sections by narrow, transverse webs 21. Each pocket section is connected, by a line 22 that is equipped with a throttle 23, to a pressure chamber 14. The pocket surface At is somewhat larger than the pressure surface Ak. For this purpose, the ring dement has an expansion 24 in the region of the pocket. The interior space 11 has a cross-sectional area Ai which is connected by an outlet line 25 to a first throttle element 26, in the form of an adjustable pressure holding valve.

Furthermore, an intermediate space 27 between the roll sleeve 6 and the carder 9 is connected by a second outlet line 28 to a second throttle element 29 in the form of an adjustable pressure holding valve.

Referring to FIG. 2, the support element 10 is shown connected only to the pressure-control valve arrangement 18 and to the first throttle element 26. The remaining support elements can each have their own valves and throttle elements. These support elements 10 can also be connected together in zones. The extreme positions of the two throttle elements 26 and 29 were mainly considered above. In intermediate positions, that is with partial throttling, intermediate pressures Pi and Pu result, which the operator can use appropriately.

As a result, the following operating modes are possible, it being assumed that the pressure Pk prevails in the pressure chamber 14, the interior pressure Pi prevails in the interior space 11, and the external pressure Pu prevails in the ring space 27.

1. If both throttle elements 26 and 29 are open, then Pu=0, Pi=0, and Pk>0.

In this case, the support element 10, which is designed as a ring element, operates with a relatively small resulting pressure surface At. Since the surface Ai is without pressure because of the out-flowing oil, this procedure has the advantage that low path loads can be run in the roll gap 3 with hydraulic pressures which are not prohibitively small but which lie within the manageable range.

2. If the first throttle element 26 is wholly or partially closed, whereas the second throttle element 29 is open, then Pu=0, 0<Pi<Pt, and Pk>0.

The oil flowing back through the interior space 11 is now throttled by the throttle element 26. Consequently, a pressure Pi builds up in the interior space. Together with the surface Ai, this acts additionally as a force on the roll sleeve 6. If the pressure medium is completely throttled as it flows back from the interior space 11, a pressure Pi equal to the pocket pressure Pt will result. In this case, the maximum support capacity of the ring element has been reached, depending on the pressure. Due to the relatively large total surface, very large path loads can also be handled with conventional oil pressures.

3. If the second throttle element 29 is closed, but the first throttle element 26 is open, then Pu>0, Pu<Pt<Pk, and Pi=0.

Since the pressure medium from all support elements is throttled as it flows back through the ring space 27, a pressure Pu>0 results in the ring space. This pressure acts on the entire inside surface of the roll sleeve 6, except for the region of the annular support elements 10. Since the pressure medium flowing through the interior space is not throttled here, the ring element acts on the roll sleeve 6 as a negative force, as a force results on the opposite side which is equal to the product of the pressure Pu and the interior area Ai. In this way, by means of the ring element, a force directed away from the roll gap 3 can be exerted on the roll sleeve 6. Consequently, by using the ring elements, sources of counter-support, which are affixed in a direction away from the gap, are obviated, whether to achieve the desired bend or whether to move the roll sleeve away from the gap 3.

Figure 3:
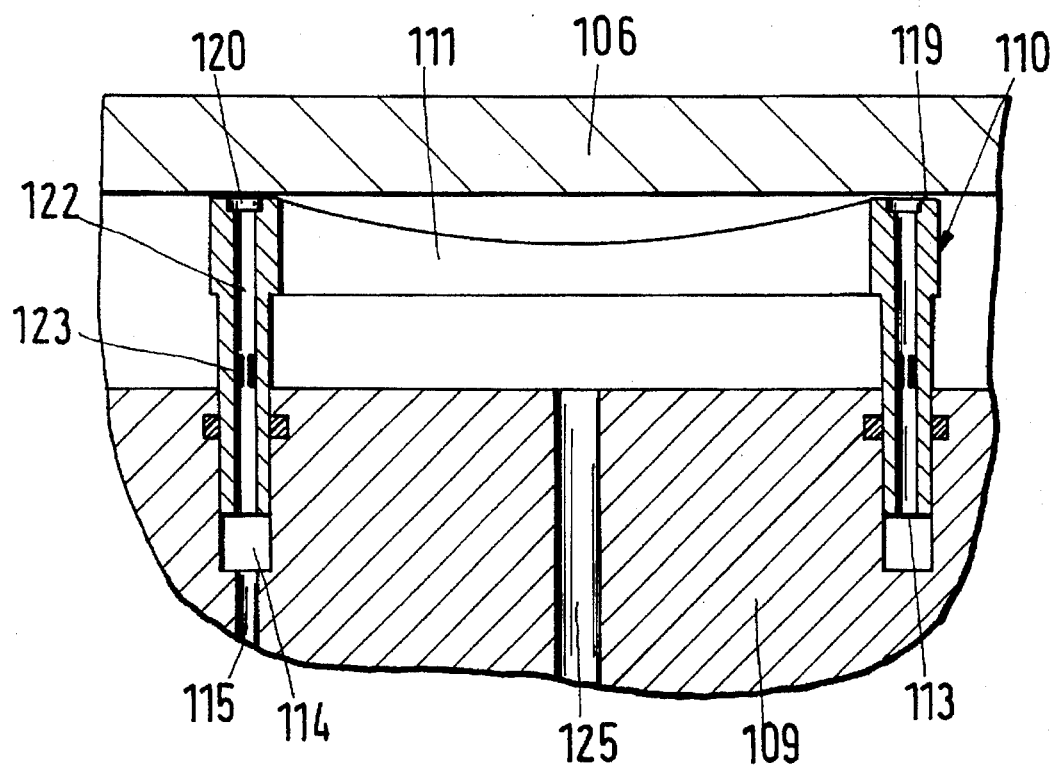
FIG. 3 is a partial longitudinal sectional view through a support region according to the present invention.
Figure 4:
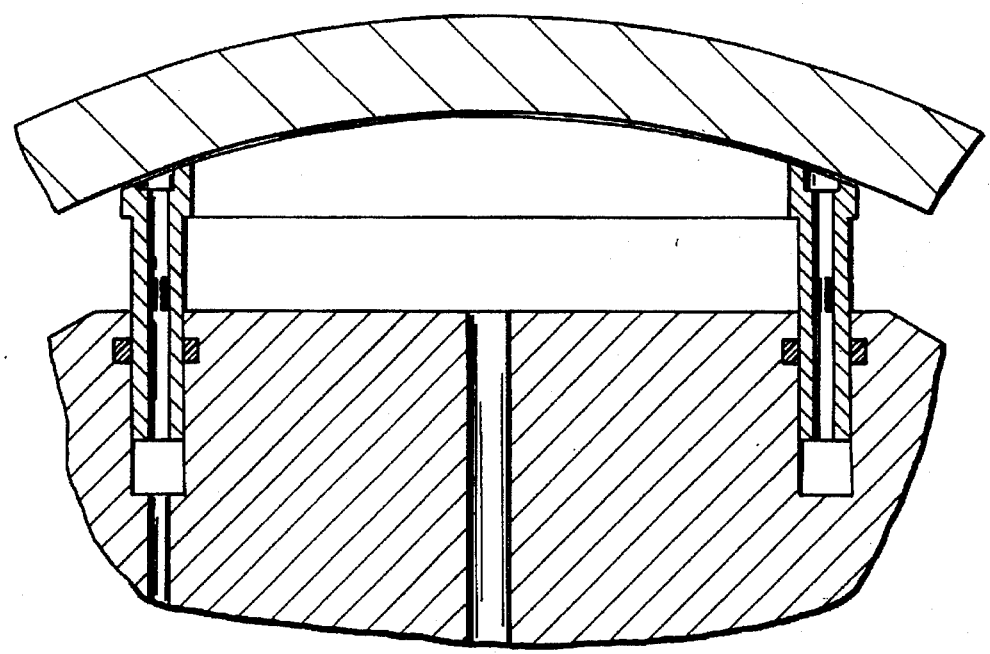
FIG. 4 is a partial cross-sectional view through a support region according to the present invention.
Figure 5:
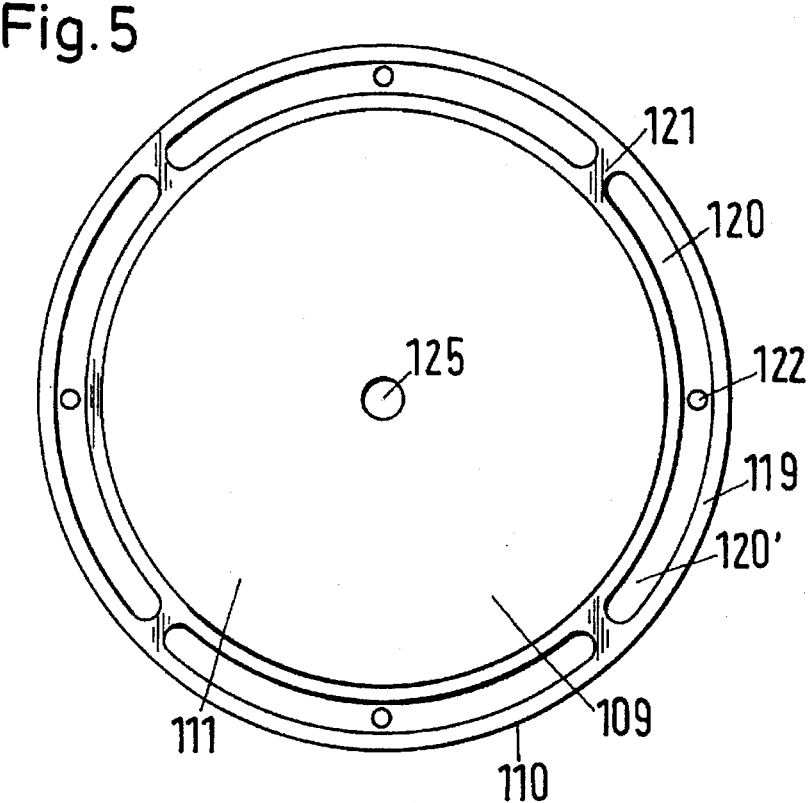
FIG. 5 is a top view of the support element according to the present invention.

Referring to FIGS. 3–5, reference numbers incremented by 100 are used for the corresponding parts. These figures show a design, close to actual practice, with an especially narrow support surface 119, which makes it possible to operate with relatively low path loads. The support element 110 has an annular cross section. The annular pocket 120 is divided into pocket sections 120' by narrow, transverse webs 121. Each of these pocket sections are connected to the pressure chamber 114 by a line 122 designed as a bore hole. This stabilizes the ring element against tilting, which can be caused by friction forces that act on the ring element as a result of the rotation of the roll sleeve 6.

Figure 6:
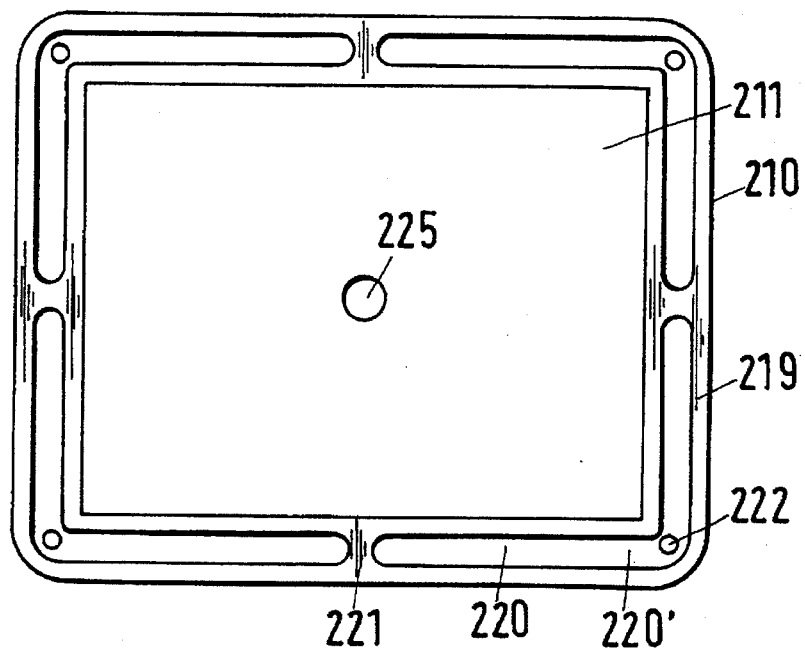
FIG. 6 is a top view of the support element in an alternate embodiment according to the present invention.

Referring to FIG. 6, reference numbers incremented by 200 are used for the corresponding parts. FIG. 6 shows that the support element 220 can also have a cross section which is not annular but rectangular. Accordingly, a support surface 219 is provided with a rectangular shape. The pockets 220 are divided into pocket sections 220' by transverse webs 221. These pocket sections are again connected to the pressure chamber by a line 222 and by a throttle.

While the embodiment of the invention shown and described is fully capable of achieving the results desired, it is to be understood that this embodiment has been shown and described for purposes of illustration only and not for purposes of limitation. Other variations in the form and details that occur to those skilled in the art and which are within the spirit and scope of the invention are not specifically addressed. Therefore, the invention is limited only by the appended claims.

What is claimed is:

1. A roll for a calender having controlled bending, comprising:

a non-rotatably mounted carrier;

a plurality of hydrostatic support elements each having a ring-shaped support surface with at least one ring-shaped pocket in said support surface;

a roll sleeve supported by said hydrostatic support elements against said non-rotatably mounted carrier, said support elements being disposed within said roll sleeve, said at least one pocket of each hydrostatic support element faces an inside surface of said roll sleeve, each of said plurality of hydrostatic supports elements having a pressure surface which faces said carrier to delimit a pressure chamber therebetween, each of said pressure chambers being in fluid communication with a pressure feed line, each of said pressure chambers also being in fluid communication, through a throttle, with said respective at least one pocket;

an interior space being enclosed by each of said plurality of hydrostatic support elements, each of said interior spaces being in fluid communication with an outlet line; and an adjustable throttle element being disposed in each of said respective outlet lines.

2. The roll of claim 1, wherein said support elements comprise ring elements.

3. The roll of claim 1, wherein said at least one pocket is annular.

4. The roll of claim 1, wherein said pressure surface is annular.

5. The roll of claim 4, wherein said at least one pocket and said annular pressure surface are situated radially behind one another so as to be approximately congruent.

6. The roll of claim 5, wherein said pocket surface is slightly larger than said pressure surface.

7. The roll of claim 1, wherein an intermediate space remaining between said roll sleeve and said carrier is connected to a second outlet line having a second adjustable throttle element.

8. The roll of claim 7, wherein said second adjustable throttle element is an adjustable valve.

9. The roll of claim 8, wherein said adjustable valve is a pressure holding valve.

10. The roll of claim 1, wherein said support elements have an annular cross section.

11. The roll of claim 1, wherein said at least one pocket is divided by transverse webs forming at least two pocket segments, wherein each of said at least two pocket segments is connected by said throttle to said pressure chamber.

12. The roll of claim 1, wherein said adjustable throttle element is an adjustable valve.

13. The roll of claim 12, wherein said adjustable valve is a pressure holding valve.

* * * * *